United States Patent
Fitzner et al.

(10) Patent No.: US 8,254,351 B2
(45) Date of Patent: Aug. 28, 2012

(54) COMMUNICATION NETWORK AND OPERATING METHOD FOR AGRICULTURAL WORKING MACHINES

(75) Inventors: Werner Fitzner, Warendorf (DE); Heinz-Hermann Wippersteg, Buende (DE); Thilo Steckel, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 1141 days.

(21) Appl. No.: 11/764,867

(22) Filed: Jun. 19, 2007

(65) Prior Publication Data
US 2007/0298744 A1   Dec. 27, 2007

(30) Foreign Application Priority Data
Jun. 21, 2006   (DE) .................... 10 2006 028 909

(51) Int. Cl.
*H04B 7/00* (2006.01)
*H04W 4/00* (2009.01)
(52) U.S. Cl. .................... 370/338; 455/41.2; 455/517
(58) Field of Classification Search ............ 455/41.2, 455/41.3, 445, 517, 552.1, 553.1; 370/338
See application file for complete search history.

(56) References Cited

U.S. PATENT DOCUMENTS

| | | | |
|---|---|---|---|
| 5,412,654 A * | 5/1995 | Perkins | 370/312 |
| 6,580,981 B1 | 6/2003 | Masood et al. | |
| 6,687,616 B1 | 2/2004 | Peterson et al. | |
| 6,803,854 B1 | 10/2004 | Adams et al. | |
| 7,159,036 B2 * | 1/2007 | Hinchliffe et al. | 709/242 |
| 7,418,346 B2 * | 8/2008 | Breed et al. | 701/301 |
| 7,672,281 B1 * | 3/2010 | Humphries et al. | 370/338 |
| 2005/0118991 A1 * | 6/2005 | Koganti et al. | 455/419 |
| 2006/0047418 A1 | 3/2006 | Metzler et al. | |
| 2006/0266309 A1 | 11/2006 | Lang et al. | |
| 2007/0149204 A1 * | 6/2007 | Redi et al. | 455/446 |
| 2007/0255682 A1 * | 11/2007 | Brelsford et al. | 707/2 |

FOREIGN PATENT DOCUMENTS

| | | |
|---|---|---|
| DE | 43 22 293 | 1/1995 |
| DE | 199 14 829 | 1/2001 |
| DE | 100 64 862 | 7/2002 |
| DE | 103 35 112 | 2/2005 |
| DE | 10 2004 039 | 4/2006 |
| EP | 1 357 713 | 10/2003 |
| WO | 00/35265 | 6/2000 |
| WO | 01/22755 | 3/2001 |

* cited by examiner

*Primary Examiner* — Wesley Kim
(74) *Attorney, Agent, or Firm* — Michael J. Striker

(57) ABSTRACT

A communication network contains several nodes, which are equipped with transmitter/receiver units for wireless communication, including nodes referred to as mobile nodes that are installed on mobile machines. So that decentralized decisions can be made regarding the use of the mobile machines at the sites where the machines are located, a memory for storing the operating parameter profiles of several of the mobile machines is assigned to each node; every node is designed to transmit profiles stored in its assigned memory via its transmitter/receiver unit, and to update the profile of a particular mobile machine stored in its assigned memory based on a profile of this mobile machine that is received from another node.

13 Claims, 2 Drawing Sheets

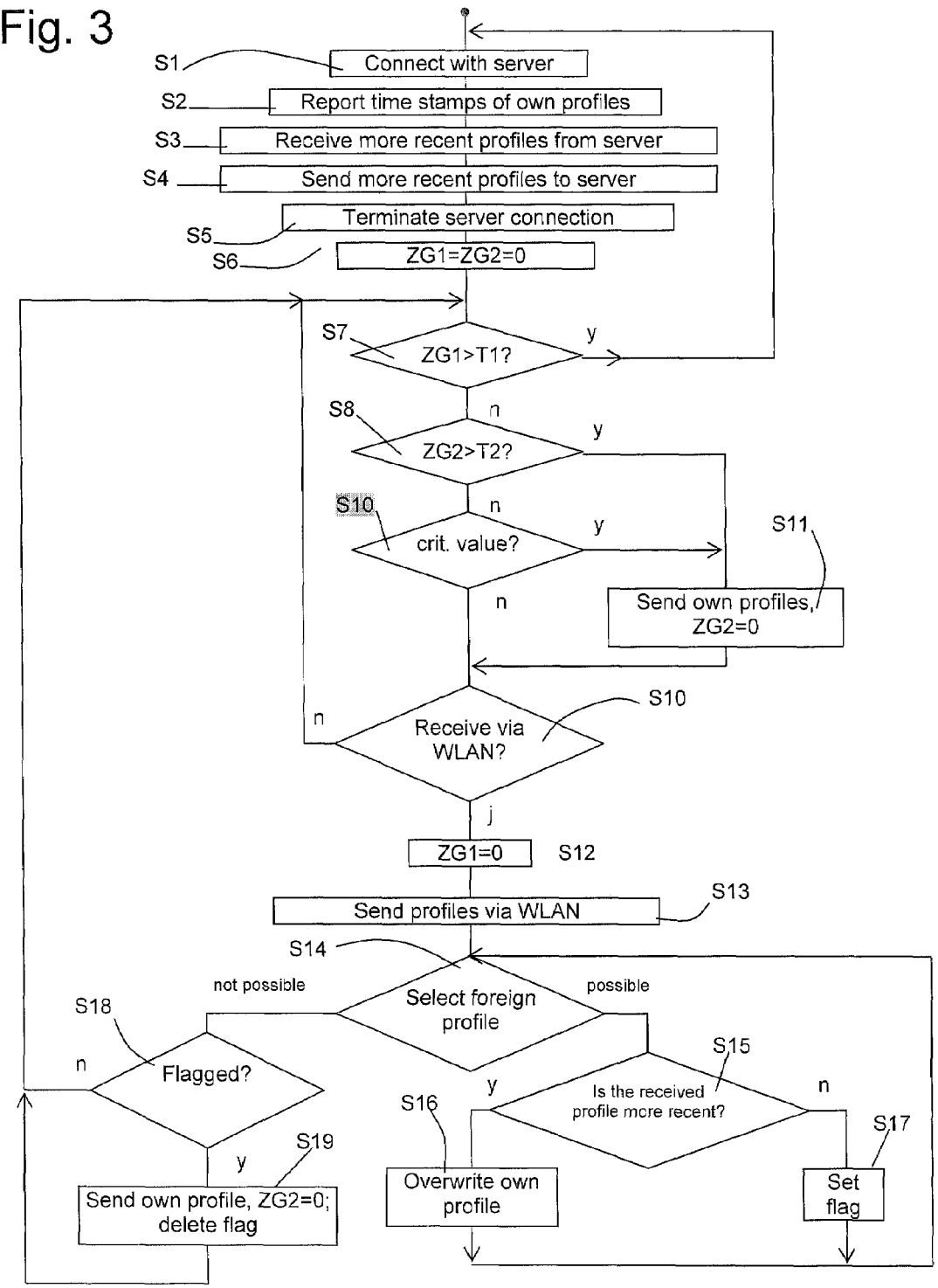

COMMUNICATION NETWORK AND OPERATING METHOD FOR AGRICULTURAL WORKING MACHINES

CROSS-REFERENCE TO A RELATED APPLICATION

The invention described and claimed hereinbelow is also described in German Patent Application DE 10 2006 028 909.9 filed on Jun. 21, 2006. This German Patent Application, whose subject matter is incorporated here by reference, provides the basis for a claim of priority of invention under 35 U.S.C. 119(a)-(d).

BACKGROUND OF THE INVENTION

The present invention relates to a communication network that includes several nodes, which are equipped with transmitter/receiver units for wireless communication; at least a few of these nodes—referred to as mobile nodes—are installed on mobile machines. The present invention also relates to an operating method for a communication network of this type.

A communication network of this type that is used in the field of agriculture is made known, e.g., in DE 43 22 293 A1.

Wireless communication networks are known in general, in a wide variety of types. Even though a large portion of the populated surface of the earth is covered by cellular mobile communication networks, there are gaps in this coverage, particularly in agricultural areas, and it cannot be assumed that this problem will be fundamentally resolved. Rather, it is expected that the total surface area covered by modern, broadband, fourth-generation, mobile communication networks, e.g., UMTS networks, will remain smaller than that covered by the established, third-generation networks based, e.g., on the GMS standard. A communication network designed to function anywhere on the surface of the earth must therefore be designed to not rely on the availability of the cellular mobile communication infrastructure, either at all, or at least not continuously.

Another known type of communication network for wireless communication are WLANs (Wireless Local Area Networks) or WIMAX networks, which usually operate based on a standard in the IEEE 802.11 or 802.16 family. The range of radio contact in a network of this type is typically 30 to 100 m, and, at best, up to 300 m in the case of a WLAN, and up to a few kilometers in the case of a WIMAX. These ranges cannot be easily increased, since the level of reliable transmit power of a network of this type is limited by law in many countries. Since, in addition, these networks are not designed to transmit data between source nodes and target nodes via intermediate nodes, communication between two nodes cannot be carried out when they are further apart than the range of radio contact, even when further nodes of the network are located between these two nodes and the distance between two adjacent nodes does not exceed this range.

SUMMARY OF THE INVENTION

The object of the present invention is to provide a communication network of the type described initially that makes it possible to estimate—at a given node in the network—the operating state of a mobile machine located further away, even when it is not possible to establish direct communication with a node of the remote machine at that time.

The object is attained with a communication network that includes several nodes—which are equipped with transmitter/receiver units for wireless communication, including nodes referred to as mobile nodes that are installed on mobile machines—as follows: A memory for storing operating parameter profiles of several of the mobile machines is assigned to each node, and every node is designed to transmit operating parameter profiles stored in its assigned memory via its transmitter/receiver units, and to update the profile of a particular mobile machine stored in its assigned memory based on an operating parameter profile of this mobile machine that was received from another node. Due to the operating parameter profiles stored in the memories, every node has knowledge of the operating status of several machines, which are preferably all working together in the network. Although this knowledge is not necessarily always up-to-date, it is still helpful for enabling a user or a service program to plan the further application of the machines in a reasonable, economic manner.

Given that the nodes transmit these operating parameter profiles, it is made possible for the nodes to exchange the knowledge of the operating states of the machines with each other and to thereby store only the most up-to-date operating parameter profile of each machine. The knowledge of the operating state of a machine can therefore propagate in the communication network from its own node outward, possibly in several consecutive steps. Decisions regarding, e.g., the economical use of the mobile machines, can be made at each node in the network based on the profile information available there.

According to a preferred exemplary embodiment, the mobile machines include agricultural working machines and/or hauling machines, e.g., harvesting machines, which move continuously to deliver crop material, and hauling vehicles that pick up the crop material from the harvesting machines in order to carry it to a site for storage or further processing.

In order to make economical use of the harvesting machines and hauling vehicles, it is advantageous when, e.g., the fill level of a grain tank of the machine, and its location, are indicated in the operating parameters of each machine stored in the profiles. Based on these parameters, e.g., a hauling vehicle (or its driver) can decide which of several harvesting machines would be best—in terms of productivity and economic benefit—to unload next, e.g., to minimize the distance traveled by the hauling vehicles and/or downtimes of the harvesting machines caused by the supply container being full.

In order to make a decision of this type in the most optimal manner possible, it is advantageous when one of the operating parameters stored in the profiles includes information about the performance capability of the machine. The greater the performance capability of the machine is, the more important it is for economical operation in general that the machine be capable of operating continually at full performance. It is therefore advantageous to assign higher priority to emptying the grain tank of a higher-performance machine than that of a lower-performance machine.

In order to correctly update the operating parameter profiles in the memories assigned to the various nodes, a time stamp is advantageously assigned to each of the stored operating parameter profiles, and the nodes are preferably designed to determine—in the process of updating the operating parameter profiles of two profiles that relate to the same mobile machine (i.e., a profile stored in the memory of a node and a profile received from another node)—which of the two profiles is older, and to overwrite this older profile.

A first embodiment of a procedure carried out by a first node to update a profile includes the following steps:

a) Receive—from the second node—a set of time stamps, each of which is assigned to a profile of a machine in a memory assigned to a second node,
b) Compare them with the corresponding time stamps in the memory assigned to the first node, and determine in which of the machines the profiles assigned to the first node must be overwritten,
c) Prompt the second node to transmit the profiles of these machines, and
d) Store the profiles that were transmitted—as prompted—by the second node, instead of storing the profiles to be overwritten.

Given that, initially, only the time stamps are transmitted, the first node can determine which of the profiles is required by the second node, and it can request them in particular. Using a procedure of this type, the quantity of data to be transmitted between the nodes is kept small. This is important, in particular, when the transmission bandwidth is small, or when the transmission generates costs that depend on the quantity of data transmitted or the amount of time required for the transmission, which is typically the case when a cellular mobile communication network is used.

The time stamps received in step a) can also be used to determine, in step b), which of the profiles in the memory of the second node must be overwritten, so that these profiles can be transmitted to the second node in a further step (step e)). The transmission of the time stamps from the second node to the first node in step a) is therefore sufficient to update the profiles in both nodes.

As an alternative, the first node can perform an update using the following steps:
a') Receive—from the second node—a profile stored in a memory assigned to a second node, and a time stamp assigned to this profile,
b') Compare the received time stamp with the corresponding time stamp in the memory assigned to the first node, and overwrite the profile in the memory assigned to the first node with the received profile if the comparison reveals that the time stamp assigned to the latter profile is the most recent.

With this procedure, the quantity of data to be transmitted by the second node is greater than with the first procedure described above, since the second node transmits a stored profile even when it is not required for updating on the first node, but this latter procedure has the advantage that it is easy to implement, since the second node does not require feedback from the first node.

In the absence of feedback of this type, it is advantageous when the second node is designed to periodically transmit the profiles stored in the memory assigned to it.

The nodes in the inventive communication network preferably support a first operating mode, in which the transmitter/receiver units of the mobile nodes, at the least, communicate with each other directly, without utilizing any of the intermediate nodes that are forwarding the profiles.

In a first operating mode, the transmitter/receiver units preferably communicate according to the WLAN, WIMAX, or Bluetooth standard.

The nodes can also support a second operating mode, in which two of the mobile nodes communicate with each other via a stationary node. In this case, the stationary node preferably includes—as the transmitter/receiver unit—a base station of a cellular mobile communication network, and each of the transmitter/receiver units of the mobile nodes includes an end device of the mobile communication network.

According to a particularly preferred embodiment, each of the mobile nodes is designed to temporarily switch from the first operating mode to the second operating mode when no communication takes place with another node for a specified time period in the first operating mode. In this manner, when a mobile node is located outside the range of the transmitter/receiver units of the other mobile nodes, it can obtain information about the operating states of the machines via the stationary node, provided this information is known to the stationary node.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a flow chart of an operating method that takes place in a mobile node of the communication system in FIG. 1.

DESCRIPTION OF THE PREFERRED EMBODIMENTS

Figure 1:
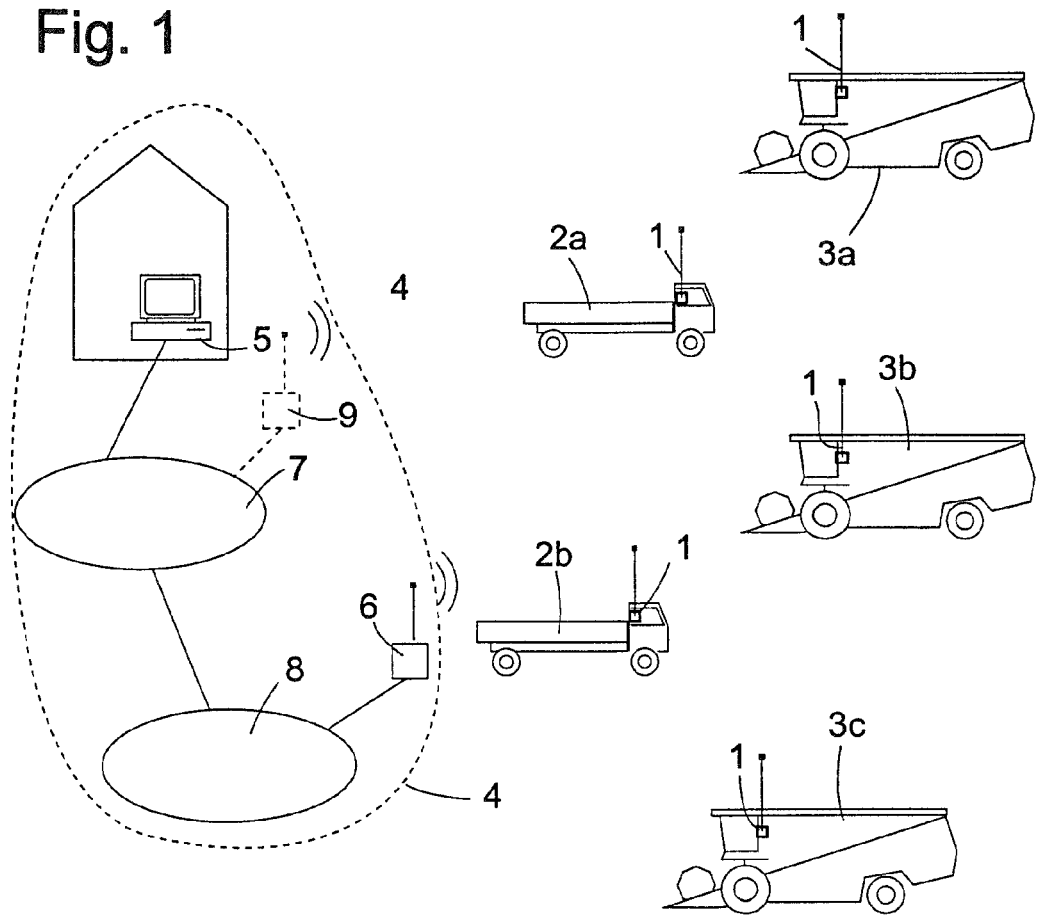
FIG. 1 is a schematic depiction of an inventive communication system.

The communication system shown in FIG. 1 includes several mobile nodes 1 installed on a vehicle 2a, 2b, 3a, 3b and 3c, and a stationary node 4. In the system depicted in FIG. 1, two mobile nodes 1 are installed on hauling vehicles 2a, 2b—shown as trucks in this case—and three mobile nodes 1 are installed on harvesting machines 3a through 3c. Nodes 1 installed on the various types of vehicles can have the identical design.

In the description of a node 1 provided below with reference to FIG. 2, it is assumed that these are the nodes of vehicle 2a, although the description also applies analogously to the nodes on the other vehicles.

Figure 2:
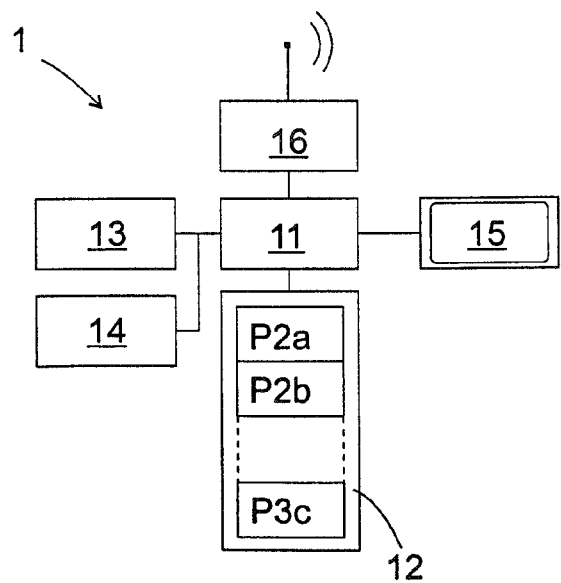
FIG. 2 is a block diagram of an mobile node.

As shown in FIG. 2, node 1 includes a processor 11 and a memory 12 for storing operating parameter profiles P2a, P2b, P3a, P3b, P3c of all vehicles 2a, 2b, . . . , 3c in the system. Profile P2a, which describes vehicle 2a, on which particular node 1 is installed, will be referred to below as "its own" profile, and profiles P2b, P3a, P3b, P3c will be referred to as the "foreign" profiles.

Processor 11 is connected with various peripheral units in order to inquire about operating parameters and save them in its own profile P2a in memory 12, e.g., using a GPS receiver 13 for querying the current geographical position of the vehicle, fill level sensors 14 for detecting the quantity of crop material currently contained in a storage compartment of the vehicle or the fill level of a fuel tank of the vehicle, or the like.

Profile P2a, . . . , P3c of each vehicle stored in memory 12 can also include constant properties of the particular vehicle, e.g., the capacity of the supply container of the vehicle, or the harvesting capacity when a harvesting machine is involved, etc.

A user interface 15 makes it possible for the driver of vehicle 2a to call up the profiles stored in memory 12 by its nodes 1, in order to use these profiles to make a decision regarding the next steps. For example, the driver of vehicle 1a, which is a hauling vehicle, can call up the fill levels of the grain tank of individual harvesting machines 3a, 3b, 3c and their positions from stored foreign profiles P3a, P3b, P3c, in order to then select and control the particular harvesting machine that needs to be unloaded next, or, when several harvesting machines are involved which need to be unloaded, to control the machine that is most easily reached, or the machine that has the highest harvesting output and is therefore the machine that most importantly should not be brought to a standstill, for economic reasons. Based on foreign profile P2b, the driver can also determine whether hauling vehicle 2b may be better capable than his own vehicle 2a of unloading a certain harvesting machine that needs to be unloaded, so that several hauling vehicles do not control this harvesting machine.

The tasks of processor 11 do not have to be limited to compiling and displaying profiles of the individual vehicles; it can also enable the driver to make a decision or, in certain cases, to relieve him entirely of the task of making a decision by preparing the information contained in the profiles in a suitable manner.

In order to keep foreign profiles P2b, P3a, P3b, P3c stored in memory 12 up-to-date, node 1 of vehicle 2a requires a transmitter/receiver unit 16 that is capable of communicating with the transmitter/receiver units of nodes 1 of the other vehicles. In the simplest case, the transmitter/receiver unit is a radio interface that is capable of communicating directly with the radio interface of every other node 1 located within range. The radio interface can operate, e.g., according to the WLAN, WIMAX or Bluetooth standard, or any other standard that supports a network structure with dynamically fluctuating participants; only WLAN will be referred to in the description below, and it serves to represent all of these different standards.

According to a second simple embodiment, transmitter/receiver unit 16 includes an end device for cellular mobile communications, and stationary node 4 includes a base station 6 that is compatible with the end devices and serves a stationary server 5 as a transmitter/receiver unit. Server 5 is connected with base station 6 via Internet 7 and stationary infrastructure 8 of the cellular mobile communications system. Stationary infrastructure 8 and Internet 7 are transparent to the data transmitted between server 5 and mobile node 1, thereby enabling them to be grouped together with base station 6 and server 5 as network node 4.

In the preferred embodiment of the present invention described below, transmitter/receiver unit 16 includes a WLAN radio interface and an end device for cellular mobile communications, and it is switchable between an operating state in which it communicates via cellular mobile communications and a WLAN-communication operating state.

The method of operation of the network shown in FIG. 1 is explained with reference to the flow chart in FIG. 3, which shows a working method carried out in processor 11 of a mobile node 1.

The method starts at step S1 with start-up of vehicle 2a, on which node 1 is installed. It is assumed that, before vehicle 2a is started up, no data are transmitted between its node 1 and the other nodes 1, 4 in the network. Memory 12 of vehicle 2a therefore contains no profiles—except for its own profile P2a of vehicle 2a—or any foreign profiles contained therein are most likely outdated. In step S1, therefore, a connection is established between mobile node 1 and server 5 via cellular mobile communications network 8 and Internet 7.

Via the existing connection, node 1 first transmits, in step S2, the time stamps of its own profiles, and those of any foreign profiles stored in its memory 12, to server 5. Profiles of all vehicles 2a, 2b, 3a, 3b, 3c are stored in a memory of the server, each with a time stamp indicating when it was generated. In step S2, server 5 compares every transmitted time stamp with the time stamp assigned to the same vehicle in a memory to determine which profile is the most current. If the time stamp of a profile stored on the server is more current, server 5 transmits the corresponding profile to mobile node 1. Mobile node 1 receives it in step S3 and uses it to overwrite the corresponding profile in its memory. When the server determines that the profile stored in mobile node 1a is the more current one, it transmits a send request instead to mobile node 1a, which then transmits the requested profile in step S4. Server 5 uses the profile it receives to overwrite the older profile it has stored. After step S4, server 5 and node 1 therefore have identical profiles. In step S5, the connection between mobile node 1a with server 4 is terminated.

The initialization of mobile node 1a ends when timers ZG1, ZG2 are set to zero in step S6. These timers are subsequently incremented continually over time, although this is not shown in the flow chart.

In step S7, a check is carried out to determine whether a time period T1 has passed since timer ZG1 has been reset. This time period can last from a few minutes to hours. The result, therefore, is that time period T1 has not passed, and the method continues to step S8, in which a check is carried out to determine whether a time period T2—which is much shorter than T1—has passed for timer ZG2. If this time period has not passed yet, either, the method continues to step S9, in which a check is carried out to determine whether an operating parameter of the vehicle has reached a critical value that should be communicated to another node 1. A critical value of this type can be, e.g., a high fill level of the grain tank, which means it should be emptied as soon as possible in order to keep using the vehicle, or it can be a low fill level of the fuel tank, which means it should be refueled by a supply vehicle as soon as possible. If there is no critical value present, the method continues to step S10, in which a check is carried out to determine whether there are data to be received via WLAN from the other nodes 1b, 2a, ..., 2c. If this is not the case, steps S7, S8, S9, S10 are repeated in cycles until time period T2 has passed, a critical value has been reached, or there are data to receive via WLAN. In the first two cases, mobile node 1a transmits its own profiles stored in its memory, in step S11, and then resets timer ZG2 to zero.

In the latter case, node 1 of vehicle 2a resets timer ZG1 to zero in step S12 and, in step S13, it receives the profiles of individual vehicles 2a, ..., 3c sent by the other mobile node 1. In step S14, node 1 selects a foreign profile from among the profiles it has received. In step S15, a decision is made based on a time stamp transmitted with the selected foreign profile as to whether its own, locally stored profile is more recent, or if the profile received in step S13 is more recent. If it is determined that the profile that was received is more recent, the method branches from step S15 to S16, in which the locally stored profile is overwritten with the profile that was received. If it is determined, however, that one of the profiles that was received is older than the profile stored for the same vehicle in node 1 of vehicle 2a, a flag is set in step S17 to indicate this.

Once step S16 or S17 is completed, the method returns to S14, where another foreign profile is selected, and steps S15 through S17 are carried out once more, for this new foreign profile. If there are no foreign profiles left to be processed, the method jumps from S14 to S18, in which the status of the flag is checked. If a flag has not been set, the method returns directly to step S7. If a flag has been set, the method carries out a step S19 before it returns to S7. In step S19, node 1 transmits the profiles stored in its own memory 12 via WLAN, resets timer ZG2 to zero, and deletes the flag. It can be assumed that, when node 1 of vehicle 2a is capable of receiving profiles from another node via WLAN, then this other node is also capable of receiving profiles transmitted from node 1 of vehicle 2a. It is therefore advantageous to also update the profiles received from this other node, in step S19.

If it is determined in step S7 that a time period T1 has passed since timer ZG1 was reset, this means the foreign profiles in node 1 of vehicle 2a have not been updated since then, and the current "own" profile was probably not successfully transmitted to any other vehicle during this same time period. To prevent the profiles from becoming outdated, node 1 of vehicle 2a therefore carries out initialization steps S1 through S6 once more.

The expensive utilization of the cellular mobile communication network is therefore limited to situations in which communication via WLAN cannot be carried out. Still, every node 1, 4 has access at all times to profiles from all vehicles that make it possible to evaluate—approximately, at the least—the state of the overall system. As a result, it is possible to make a decision in a decentralized manner, i.e., at every mobile node 1, regarding the best thing for vehicle 2a, 2b, 3a, 3b or 3c—on which this node 1 is installed—to do next.

To limit communication costs further, it is possible—according to a refined embodiment—to connect server 5 to its own WLAN radio interface, which is labeled with reference numeral 9 in FIG. 1. The connection between server 5 and WLAN radio interface 9 can be established directly or, e.g., via Internet 7, as shown in the figure, thereby making it possible for the distance between server 5 and WLAN radio interface 9 to be of any range. WLAN radio interface 9 is fixed at a site that is searched for regularly by at least some of the vehicles 2a, 2b, 3a, 3b, 3c, e.g., a gathering point at which hauling vehicles 2a, 2b unload the crop material, or a storage facility in which the vehicles are stored when not in use. The latter case has the particular advantage that all vehicles can communicate with server 5 via WLAN at start-up. Initialization steps S1 through S5 of the method depicted in FIG. 2 can therefore be eliminated, and the method of operating a mobile node 1 can start directly in step S6, in which case node 1 receives the profiles in step S12 from server 5 via radio interface 9.

It will be understood that each of the elements described above, or two or more together, may also find a useful application in other types of constructions differing from the type described above.

While the invention has been illustrated and described as embodied in communication network and operating method therefor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A communication network, comprising
several nodes equipped with transmitter/receiver units for wireless communication, said nodes including mobile nodes installable on mobile machines; and
a memory for storing operating parameter profiles of several of the mobile machines, assigned to each of said nodes and to which operating parameter profiles a time stamp is assigned to denote when each of the operating parameter profiles was generated;
wherein every node is assigned to transmit the respective profiles of the several of the mobile machines stored on its assigned memory via its transmitter/receiver unit, and to update a profile of a particular mobile machine of the several of the mobile machines stored in its assigned memory based on a profile of the particular mobile machine that was received from another node, and
wherein every node implements a process of updating parameter profiles which includes comparing a time stamp assigned to a stored profile of a mobile machine with a time stamp assigned to a received profile for the mobile machine and overwriting the stored profile with the received profile if the received profile is determined to be a more recent profile, in accordance with the following steps:
a) a first node (4) receiving (S2), from a second node (1), a set of time stamps, each of which is assigned to a profile (P2a, P2b, P3a, P3b, P3c) of a mobile machine (2a, 2b, 3a, 3b, 3c) in a memory assigned to the second node (1),
b) comparing the received time stamps with corresponding time stamps in the memory assigned to the first node (4) and determining in which of the machines the profiles assigned to the first node (4) must be overwritten,
c) prompting (S3) the second node (1) to transmit the profiles of the machines, and
d) storing the profiles transmitted (S4), as prompted, by the second node, instead of storing the profiles to be overwritten.

2. A communication network as defined in claim 1, wherein the first node (4) is also configured to determine, in step b), which profiles in the memory (11) of the second node (1) must be overwritten, and, in step e), to transmit (S4) these profiles to the second node.

3. A communication network as defined in claim 1, wherein the nodes (1) support a first operating mode (S7 through S16), in which the transmitter/receiver units (16) of the mobile nodes (1), at the least, communicate with each other directly.

4. A communication network as defined in claim 3, wherein the transmitter/receiver units (16) communicate, in a first operating mode, according to the WLAN, WIMAX, or Bluetooth standard.

5. A communication network as defined in claim 3, wherein each of the mobile nodes (1) is designed to temporarily switch from a first operating mode to the second operating mode when no communication takes place with another node for a specified time period (T1) in the first operating mode.

6. A communication network as defined in claim 1, wherein the nodes (1) support a second operating mode (S1 through S5), in which two of the mobile nodes communicate with each other directly via a stationary node (4).

7. A communication network as defined in claim 6, wherein the stationary node (4) includes, as the transmitter/receiver unit (6, 9), a base station (6) of a cellular mobile communication network, and each of the transmitter/receiver units (16) of the mobile nodes (1) includes an end device of the mobile communication network.

8. A communication network as defined in claim 6, wherein each of the mobile nodes (1) is designed to temporarily switch from a first operating mode to the second operating mode when no communication takes place with another node for a specified time period (T1) in the first operating mode.

9. A communication network as defined in claim 8, wherein the mobile machines (2a, 2b, 3a, 3b, 3c) include a storage container and are configured to transfer the contents of the storage container to another one of the mobile machines (2a, 2b, 3a, 3b, 3c) and/or to accept therefrom, and the operating parameters stored in the profiles (P2a, P2b, P3a, P3b, P3c) include a fill level of the storage container and a location of the mobile machine.

10. A communication network as defined in claim 8, wherein one of the operating parameters stored in the profiles (P2a, P2b, P3a, P3b, P3c) contains information about a performance capability of the machine (2a, 2b, 3a, 3b, 3c).

11. A communication network as defined in claim 1, wherein the mobile machines (2a, 2b, 3a, 3b, 3c) include machines selected from the group consisting of agricultural working machines, hauling machines and both.

12. A method for operating a communication network with several nodes, comprising the steps of
    providing the nodes with transmitter/receiver units for wireless communications;
    installing on mobile machines at least some of the nodes configured as mobile nodes;
    storing operating parameter profiles of several of the mobile machines in a memory assigned to each node to which profiles a time stamp is assigned to denote when each was generated;
    transmitting by a first node respective profiles of the several of the mobile machines stored in its assigned memory via its transmitter/receiver unit; and
    updating a profile of a particular mobile machine of the several of the mobile machines stored in its assigned memory based on a profile of this mobile machine that it receives from another node if the time stamp assigned to the profile received from the other node is determined to be a more recent profile than the profile assigned to the memory-stored profile, further comprising:
    a) a first node (4) receiving (S2), from a second node (1), a set of time stamps, each of which is assigned to a profile (P2a, P2b, P3a, P3b, P3c) of a mobile machine (2a, 2b, 3a, 3b, 3c) in a memory assigned to the second node (1),
    b) comparing the received time stamps with corresponding time stamps in the memory assigned to the first node (4) and determining in which of the machines the profiles assigned to the first node (4) must be overwritten,
    c) prompting (S3) the second node (1) to transmit the profiles of the machines, and
    d) storing the profiles transmitted (S4), as prompted, by the second node, instead of storing the profiles to be overwritten.

13. A communication network, comprising:
    several nodes equipped with transmitter/receiver units for wireless communication, said nodes including mobile nodes installable on mobile machines; and
    a memory for storing operating parameter profiles of several of the mobile machines, assigned to each of said nodes;
    wherein every node is assigned to transmit the respective profiles of the several of the mobile machines stored on its assigned memory via its transmitter/receiver unit, and to update a profile of a particular mobile machine of the several of the mobile machines stored in its assigned memory based on a profile of the particular mobile machine that was received from another node; and
    wherein a time stamp is assigned to each of said stored operating parameter profiles denoting when each of the operating parameter profiles was generated, and said nodes are designed to determine, based on said time stamp, and in a process of updating the operating parameter profiles of two profiles that relate to a same mobile machine, which of the two profiles is older, and to overwrite this older profile with a more recent profile, in accordance with the following steps:
    a) a first node (4) receiving (S2), from a second node (1), a set of time stamps, each of which is assigned to a profile (P2a, P2b, P3a, P3b, P3c) of a mobile machine (2a, 2b, 3a, 3b, 3c) in a memory assigned to the second node (1),
    b) comparing the time stamps with corresponding time stamps in the memory assigned to the first node (4) and determining in which of the machines the profiles assigned to the first node (4) must be overwritten,
    c) prompting (S3) the second node (1) to transmit the profiles of the machines, and
    d) storing the profiles transmitted (S4), as prompted, by the second node, instead of storing the profiles to be overwritten.

* * * * *